Sept. 8, 1936.  W. M. HORTON  2,053,478
BOLT ANCHORAGE
Filed Jan. 8, 1936
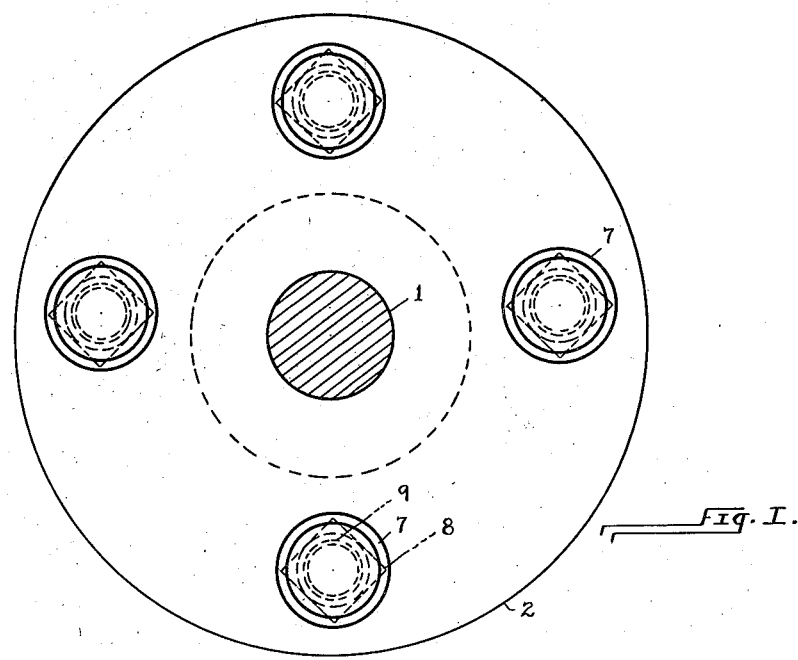
Fig. I.
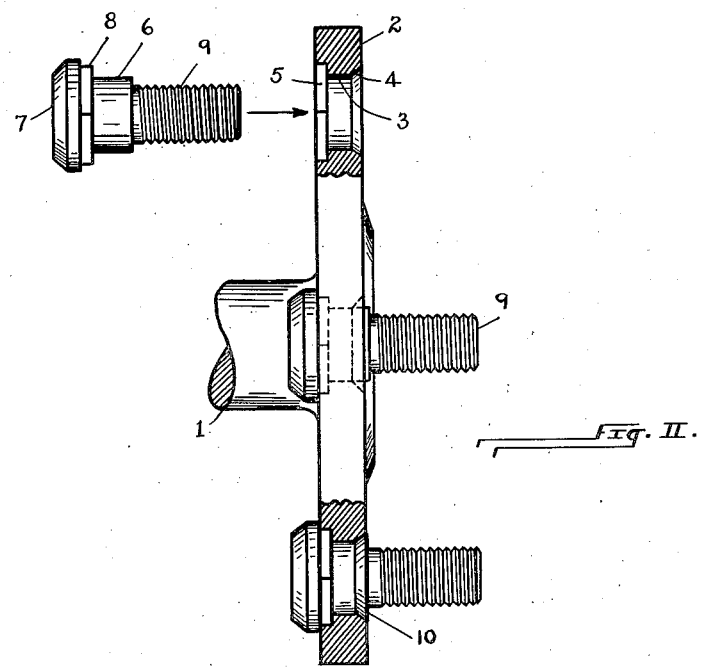
Fig. II.
INVENTOR
William M. Horton
BY
Christy and Wharton
his ATTORNEYS Patented Sept. 8, 1936

2,053,478

UNITED STATES PATENT OFFICE 2,053,478

BOLT ANCHORAGE

William M. Horton, Cleveland, Ohio, assignor to Pittsburgh Screw & Bolt Corporation, a corporation of Pennsylvania Application January 8, 1936, Serial No. 58,090

1 Claim. (Cl. 287—20)

This invention consists in an anchorage for a bolt. For many particular uses it becomes desirable to provide plates from whose surfaces the threaded stems of bolts project, that other parts, being applied, may be secured by nuts upon such stems. A specific illustration is afforded in the provision now extensively adopted for removably securing the wheels of automobiles to their axles. The axle is provided with plate-like collars of considerable radial extent. Near the peripheries of the collars the threaded stems of bolts stand out in parallelism with the axle. The webs of the wheels are provided with properly spaced orifices. In the application of the wheels, the bolts upon the axle collars are caused to protrude through the orifices in the wheel webs; and securing nuts then are applied. The invention lies in the anchoring of the bolts in the axle collar. The advantages of the invention are found in cheapness and facility of manufacture; adaptability to material of superior quality; and effectiveness and durability. It will be understood that this instance, found in the automobile industry, is but exemplary of a wider and general applicability. I shall show and describe it, however, in this partciular field of service.

In the accompanying drawing Fig. I is a view in transverse section through an axle of an automobile, showing in rear elevation (that is to say, in direction from a mid-portion of the axle toward an outer end) one of the plate-like collars that, formed integrally with the axle, stand out at its two ends. Fig. II is a view partly in elevation, partly in vertical section, showing fragmentarily the axle and one of the outstanding terminal collars.

At the ends of the axle I extend radial collars, one of which, the collar 2, is here shown. These outstanding collars upon the automobile axle may be steel plates three eighths of an inch thick and six inches in diameter. The plates are drilled near their peripheries with half-inch bores, evenly spaced around the circumference, and in these bores bolts are anchored with their threaded stems projecting outwardly.

In common practice the anchorage of the bolts is effected in the following manner. Each bore is routed with longitudinally extending flutes— say thirty-five to the circumference, and at its outer rim the bore is rebated. The bolt is provided with a corresponding body, approximately half an inch in diameter, and something more than three eighths of an inch long; and this body is fluted in correspondence to the fluting of the bore in the axle collar. The bolt at one end of the fluted body is headed; at the opposite end it is continued in a threaded stem of diameter less than the diameter of the fluted body. The bolt is inserted in the orifice in the collar, in direction from the inside outward, and with the flutings of bolt body and of the bore in registry. The bolt is advanced until the head bears upon the rear face of the collar, and then a swedging of the body of the bolt swells the body within the orifice and forces the substance of the bolt body into the rebate at the rim of the orifice. This swedging reducing, minutely, the length of the bolt, effects both a security of anchorage and a tightening of the seam formed by and between the meeting surfaces, to the prevention of the seepage through even of oil. And this is important, because the collar in service closes a space that is flushed with lubricating oil; and it is requisite that oil shall not penetrate the union of wheel to axle. If it did it would for more reasons than one be objectionable; but chiefly because it would inevitably reach the rubber tires of the automobile and have deteriorating effect upon them.

The fluting of the body of the bolt for service in the manner described is accomplished by rolling; and if there be variation in the diameter of the blanks (and, inevitably, there is some), the variation will express itself in the tendency to increase and decrease in the number of flutes, in variation in the angular interval in the succession of flutes; with consequent increase in the number of articles rejected because of defect, and faulty assembly even among the pieces that have permitted of being brought together. Because of the inconstancy, even though minute, in dimension, it is necessary to form the bolts of relatively tough material (essentially steel, of course) that the bolts may adapt themselves to the conditions indicated; such relatively tough material is of relatively low grade, and requires to be carburized after shaping, to prepare it for the possible rough usage in assembling. And such elaboration of manufacturing steps adds to the cost of production.

In the practice of my invention the orifice through the axle collar is not fluted, but is smooth bored. At its outer end the bore is rebated; and at its inner end the bore is enlarged in a non-circular and typically square recess. The body of the bolt, correspondingly, is smooth surfaced with a non-circular (and typically square) enlargement immediately beneath its head. Minute variations in the diameter of the body of the bolt are not effective to disturb the interengagement of bolt and orificed plate in making assembly; and in the ensuing swedging operation an anchorage no less secure and a seam no less tight are produced. Manifestly the smooth-bored orifice and the smooth-surfaced bolt body do not involve the expense in production that the fluted parts of the hitherto usual practice require. Since difficulties of making assembly are reduced, the bolts may be made of superior material, of high tensile strength, that requires no carburizing, but merely heat-treatment; and the costs of production are in this particular also less.

Referring to the drawing, the bores 3 in the plate 2 are smooth. At its outer end each bore is rebated as shown at 4, and at its inner end the bore is provided with a non-circular, and in this case square, enlargement 5. The body 6 of the bolt is cylindrical. Upon one end is formed the head 7. Beneath the head the body of the bolt is provided with an enlargement 8 that corresponds in shape and size to the enlargement 5 in the bore in plate 2. The stem 9 of the bolt, extending beyond the body 6, is of less diameter than the body 6, and is threaded.

The bolt is introduced into the orifice in plate 2 in direction from the inside outward, as indicated by an arrow in Fig. II. When the bolt has thus been seated its body is swedged, to fill snugly the orifice in the collar, and in the swedging operation the substance of the body is extended in a bead 10 that fills the rebate 4.

The anchorage so effected, permissive of the use of superior material and capable of production at small cost, is secure. And it is fluid tight: no oil can seep through.

The automobile wheel is applied in usual manner by bringing it to position, with the bolt stems 9 protruding through corresponding orifices in the web of the wheel. Securing nuts are then applied to the bolt stems.

It is manifest that the anchorage is of general applicability, wherever a bolt is to be secured with stem projecting from a plate.

I claim as my invention:

A fluid-tight bolt anchorage including a plate rigid under the stress of assembly and provided with a cylindrical bore enlarged at one end in a non-circular recess and rebated at the other end, and a bolt with cylindrical body headed at one end and at the other end provided with an extended threaded stem of less diameter than the cylindrical body, the bolt body being further provided immediately beneath the head with a non-circular enlargement, the said bolt being swedged in place and in fluid-tight union in the bore in the plate, and with a swedged bead filling said rebate.

WILLIAM M. HORTON.